US012725826B2

(12) United States Patent
Kim et al.

(10) Patent No.: US 12,725,826 B2
(45) Date of Patent: Sep. 1, 2026

(54) ELECTRODE ASSEMBLY MANUFACTURING APPARATUS AND ELECTRODE ASSEMBLY MANUFACTURING METHOD

(71) Applicant: SK On Co., Ltd., Seoul (KR)

(72) Inventors: Kyu Beom Kim, Daejeon (KR); Chae Rin Ryou, Daejeon (KR); Hyeon Su Bae, Daejeon (KR); Ye Jin Yun, Daejeon (KR); Jeong Hyeon Yun, Daejeon (KR); Hyea Won Yun, Daejeon (KR); Ji Hyeon Lee, Daejeon (KR); Jong Chan Im, Daejeon (KR)

(73) Assignee: SK On Co., Ltd., Seoul (KR)

( * ) Notice: Subject to any disclaimer, the term of this patent is extended or adjusted under 35 U.S.C. 154(b) by 606 days.

(21) Appl. No.: 18/446,472

(22) Filed: Aug. 9, 2023

(65) Prior Publication Data

US 2024/0063422 A1 Feb. 22, 2024

(30) Foreign Application Priority Data

Aug. 19, 2022 (KR) ........................ 10-2022-0104054

(51) Int. Cl.
*H01M 10/04* (2006.01)

(52) U.S. Cl.
CPC ................................ *H01M 10/0404* (2013.01)

(58) Field of Classification Search
CPC ............... H01M 10/0404; H01M 4/04; H01M 10/0413; H01M 10/052; H01M 10/0525; H01M 10/0585; H01M 50/46; H01M 10/058; Y02E 60/10; Y02P 70/50
See application file for complete search history.

(56) References Cited

FOREIGN PATENT DOCUMENTS

KR 10-2017-0118447 A 10/2017
KR 10-2021-0071828 A 6/2021

*Primary Examiner* — Helen Oi K Conley
(74) *Attorney, Agent, or Firm* — IP & T GROUP LLP

(57) ABSTRACT

An electrode assembly manufacturing apparatus according to an Example of the present invention may comprise: a stack table performing repetitive up-and-down movement; an electrode supply portion supplying an electrode unit comprising a cathode or an anode to the stack table; and a swing portion rotating according to contact with the stack table, wherein the stack table comprises: a support that supports the electrode unit and that does not contact with the swing portion while the stack table is raised or lowered; and a rotating tray coupled to the support and rotating by contacting with the swing portion while the stack table is lowered.

17 Claims, 14 Drawing Sheets

ELECTRODE ASSEMBLY MANUFACTURING APPARATUS AND ELECTRODE ASSEMBLY MANUFACTURING METHOD

CROSS-REFERENCE TO RELATED PATENT APPLICATION

The present application claims priority under 35 U.S.C. § 119(a) to Korean patent application number 10-2022-0104054 filed on Aug. 19, 2022, in the Korean Intellectual Property Office, the entire disclosure of which is incorporated by reference herein.

BACKGROUND OF THE INVENTION

1. Field

Examples of the present invention relate to an electrode assembly manufacturing apparatus and an electrode assembly manufacturing method.

2. Description of the Related Art

As the electronics, communications, and space industries develop, demand for lithium secondary batteries as an energy power source is drastically increasing. In particular, as the importance of global eco-friendly policies is emphasized, the electric vehicle market is growing swiftly, and research and development on lithium secondary batteries are being actively conducted worldwide.

An electrode assembly for a secondary battery comprises a cathode, an anode, and a separator interposed therebetween, and the electrode assembly may be configured by stacking individual components in the order of anode-separator-cathode-separator-anode or the like. However, since the process of stacking individual components of the existing electrode assembly requires relatively complicated manufacturing equipment and has the disadvantage that the stacking requires a long time, a new manufacturing device and method capable of improving this are required.

SUMMARY OF THE INVENTION

Examples of the present invention provide an electrode assembly manufacturing device and an electrode assembly manufacturing method that can further simplify the manufacturing process of electrode assemblies.

An electrode assembly manufacturing apparatus according to an Example of the present invention comprises a stack table performing repetitive up-and-down movement; an electrode supply portion supplying an electrode unit comprising a cathode or an anode to the stack table; and a swing portion rotating according to contact with the stack table, wherein the stack table comprises: a support that supports the electrode unit and that does not contact with the swing portion while the stack table is raised or lowered; and a rotating tray coupled to the support and rotating by contacting with the swing portion while the stack table is lowered.

An electrode assembly manufacturing method according to an Example of the present invention comprises: an electrode supply portion providing an electrode unit comprising a cathode or an anode on a support of a stack table; a stack table on which an electrode unit is disposed being raised; the stack table rotating a swing portion in one direction while being raised; the stack table contacting with the swing portion, while being lowered; the swing portion rotating a rotating tray of the stack table coupled to the support; and disposing the electrode unit on the swing portion and further lowering the stack table.

According to the present technology, by providing an electrode assembly manufacturing apparatus and an electrode assembly manufacturing method capable of further simplifying a manufacturing process of electrode assemblies, the manufacturing time and cost of electrode assemblies may be reduced.

DETAILED DESCRIPTION

Structural or functional descriptions of Examples disclosed in the present specification or application are merely illustrated for the purpose of describing Examples according to the technical principle of the present disclosure. In addition, Examples according to the technical principle of the present disclosure may be implemented in various forms other than the Examples disclosed in the present specification or application. In addition, the technical principle of the present disclosure is not to be construed as being limited to the Examples described in this specification or application.

Figure 1:
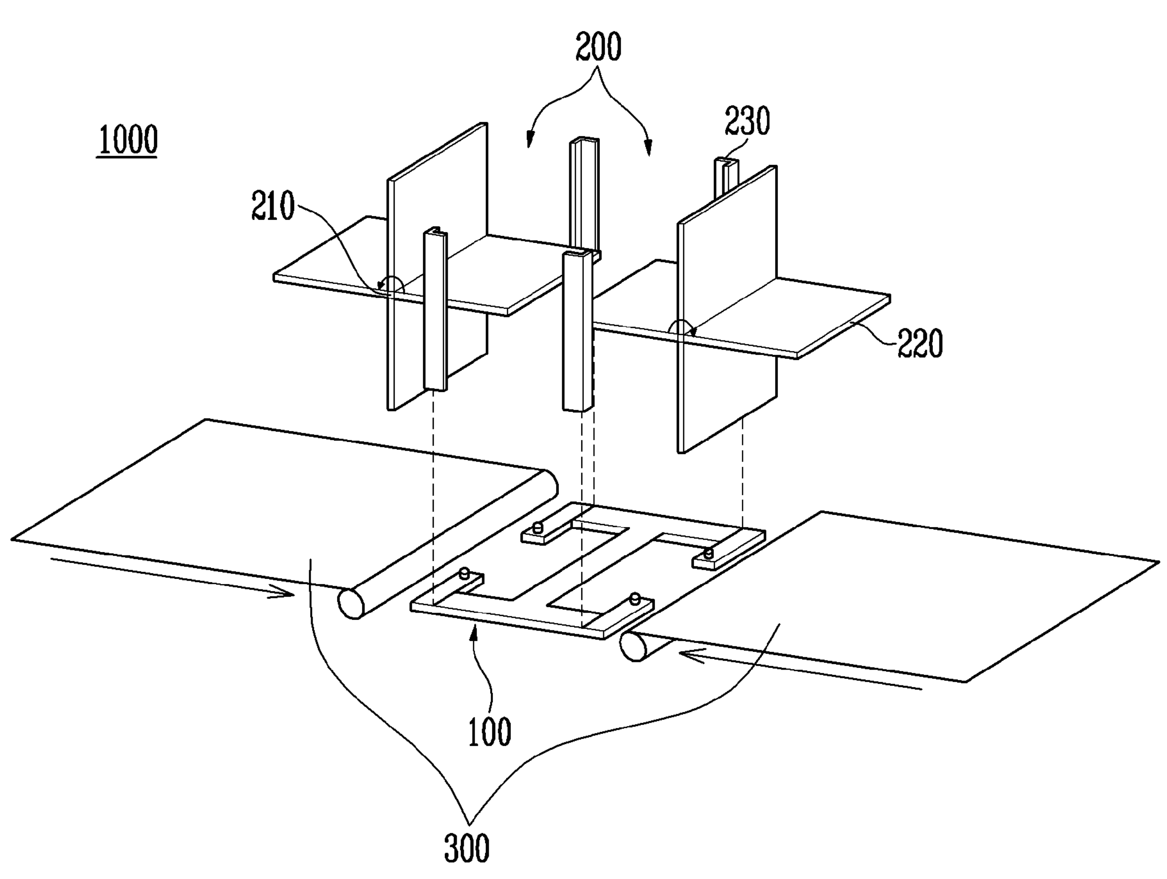
FIG. 1 is a diagram for explaining an electrode assembly manufacturing apparatus according to an Example of the present invention.

FIG. 1 is a diagram for explaining an electrode assembly manufacturing apparatus according to an Example of the present invention.

Referring to FIG. 1, an electrode assembly manufacturing apparatus 1000 may comprise a stack table 100, a swing portion 200, and an electrode supplier 300.

A swing portion 200 may be located above an electrode supplier 300, and a stack table 100 may perform up-and-down movement to pass the height between the swing portion 200 and the electrode supplier 300. A stack table 100 may be perform up-and-down movement repeatedly. In the present specification, height direction, height, upper portion, lower portion, and the like may mean the gravity direction and the height in the gravity direction.

The swing portion 200 may comprise a rotation shaft 210 and a plurality of arms 220 rotating around the rotation shaft 210. In one Example, as illustrated in FIG. 1, an electrode assembly manufacturing apparatus 1000 may comprise a plurality of swing portions 200 rotating in different directions. For example, in one swing portion 200, a plurality of arms 220 may rotate counterclockwise around the rotation shaft 210, and in another swing portion 200, a plurality of arms 220 may rotate clockwise. In addition, one or more of the plurality of arms 220 may comprise an alignment means 230 extending in a direction perpendicular to the direction in which the arms 220 extend from a rotation shaft 210. A swing portion 200 will be described in more detail with reference to FIG. 3 below.

An electrode supply portion 300 may supply an electrode unit to a stack table 100. An electrode unit may comprise a cathode or an anode. In one Example, as shown in FIG. 1, an electrode assembly manufacturing apparatus 1000 may comprise a plurality of electrode supply portions 300 supplying electrode units to a stack table 100 in different directions. For example, one electrode supply portion 300 may be a cathode supply portion supplying an electrode unit comprising a cathode, and the other electrode supply portion 300 may be an anode supply portion supplying an electrode unit comprising an anode. The cathode supply portion and the anode supply portion may supply electrode units in different directions. In FIG. 1 illustrates that electrode units may be moved in a horizontal direction, which is perpendicular to the height direction, by an electrode supply portion 300, but it is not limited thereto, and the electrode supply portion 300 may supply electrode units in various directions in which electrode units can be moved to a stack table 100. An electrode supply portion 300 may supply an electrode unit to a stack table 100 when the stack table 100 is located at the same height as or at a position lower than the electrode supply portion 300.

Figure 2:
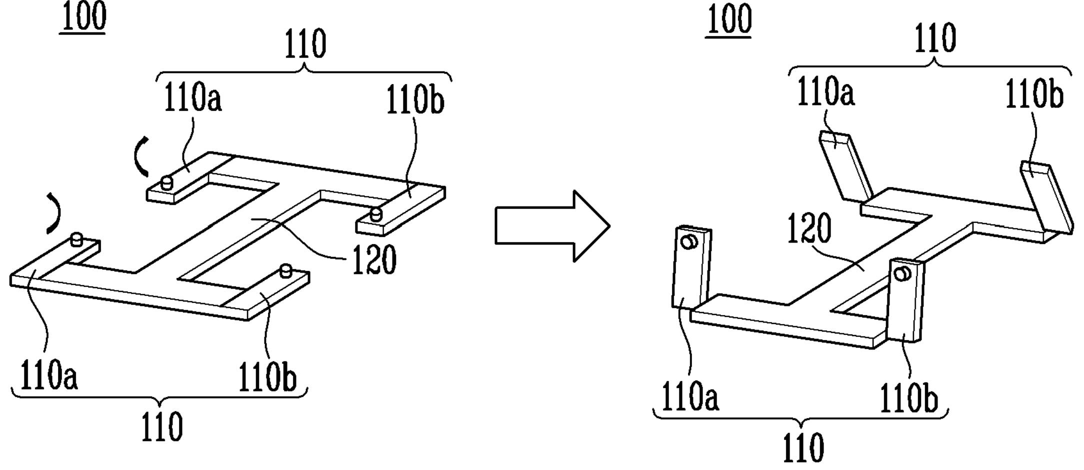
FIG. 2 is a diagram for explaining a stack table of FIG. 1.

FIG. 2 is a diagram for explaining a stack table of FIG. 1.

Referring to FIGS. 1 and 2, a stack table 100 may comprise a rotating tray 110*a*, 110*b* and a support 120.

The support 120 may support an electrode unit supplied from an electrode supply portion 300. A support 120 may have a shape that may not contact with a swing portion 200 when a stack table 100 is raised or lowered. For example, as illustrated in FIG. 2, a support 120 may have an H-shape, and a swing portion 200 may pass through an empty space of the support. However, the shape of a support 120 is not limited to the shape shown in FIG. 2, and considering the shape of a swing portion 200, a support 120 may have various shapes such that the support 120 may not contact with the swing portion 200 when the stack table 100 is raised or lowered.

A rotating tray 110*a*, 110*b* may be coupled and connected to a support 120. A rotating tray 110*a*, 110*b* may be rotated by contacting with a swing portion 200, and in one Example, it may be rotated around a part coupled to a support 120. A rotating tray 110*a*, 110*b* may be formed to rotate in only one direction. For example, as illustrated in FIG. 2, a rotating tray 110*a*, 110*b* may rotate only in the upward direction from a position parallel to a support 120 and may not rotate in the downward direction from a position parallel to the support 120. When a lower part of a rotating tray 110*a*, 110*b* and a swing portion 200 come into contact, that is, when a rotating tray 110*a*, 110*b* and a swing portion 200 come into contact while a stack table 100 is being lowered, the rotating tray 110*a*, 110*b* may rotate only in the upward direction, but when a upper part of a rotating tray 110*a*, 110*b* and a swing portion 200 come into contact, that is, when a rotating tray 110*a*, 110*b* and a swing portion 200 come into contact while a stack table 100 is being raised, the rotating tray 110*a*, 110*b* may be fixed without rotating in the downward direction. Therefore, a rotating tray 110*a*, 110*b* may rotate while a stack table 100 is raised, but may not rotate while the stack table 100 is lowered.

In one Example, as illustrated in FIG. 1, when an electrode assembly manufacturing apparatus 1000 comprises a plurality of swing portions 200, a stack table 100 may comprise a first rotating tray 110*a* contacting with any one swing portion 200 and a second rotating tray 110*a* contacting with another swing portion 200. FIGS. 1 and 2 illustrate that a stack table comprises a total of four rotating trays, including two first rotating trays 110*a* and two second rotating trays 110*b*, but the number of rotating trays is not limited thereto, and may be appropriately selected in consideration of the number and shape of swing portions.

In addition, the distance between a first rotating tray 110*a* and a second rotating tray 110*b* may be greater than or equal to the width of an electrode unit. Therefore, when an electrode unit is disposed placed on a stack table 100, it may be disposed on a support 120 such that it does not cover a first rotating tray 110*a* and a second rotating tray 110*b*. Since an electrode unit does not cover a first rotating tray 110*a* and a second rotating tray 110*b*, when a stack table 100 is lowered, a first rotating tray 110*a* and a second rotating tray 110*b* may rotate around the electrode unit.

In one Example, a stack table 100 may comprise an insulating material.

Figure 3:
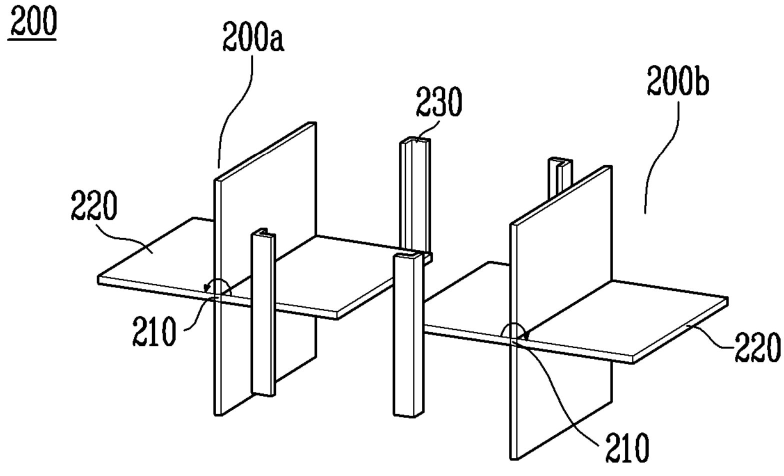
FIG. 3 is a diagram for explaining a swing portion of FIG. 1.

FIG. 3 is a diagram for explaining a swing portion of FIG. 1.

A plurality of arms 220 may rotate by contacting with a stack table 100 as the stack table 100 is raised and lowered. A plurality of arms 220 may rotate around a rotation shaft 210. A plurality of arms 220 may rotate around a rotation shaft 210 as the stack table 100 is raised. In one Example, a swing portion 200 may comprise a first swing portion 200*a* and a second swing portion 200*b* rotating in opposite directions from each other. Accordingly, in one Example, as a stack table 100 is raised, a plurality of arms 220 of a first swing portion 200*a* may rotate counterclockwise around a rotation shaft 210, and a plurality of arms 220 of a second swing portion 220*b* may rotate clockwise around a rotation shaft 210.

A swing portion 200 may comprise a plurality of arms 220. FIG. 3 illustrates that a swing portion 200 comprises four arms 220 formed at an angle of 90° to each other, but is not limited thereto and may comprise various numbers of arms 220, and the angle between individual arms may be variously set. However, considering the force transmitted by a stack table and the convenience of stacking electrode units, as illustrated in FIG. 3, a swing portion 200*a*, 200*b* may preferably comprise four arms 220 formed at an angle of 90° to each other.

While a stack table 100 performs one cycle of up-and-down movement, the stack table 100 may contact with at least two arms 220. In one Example, when a stack table 100 is raised, the stack table 100 may contact with a first arm among a plurality of arms 220 and apply a pushing force to a lower part of the first arm in an upward direction to rotate a swing portion 200. In addition, when a stack table 100 is lowered, the stack table 100 may contact with a second arm that is different from the first arm among the plurality of arms 220, and the second arm may rotate a rotating tray 110 according to the rotation direction.

In addition, a swing portion 200 may comprise an alignment means 230. An alignment means 230 may be included in one or more of a plurality of arms 220, and the alignment means 230 may extend in a direction perpendicular to a direction in which the arms 220 extend from a rotation shaft 210. In one Example, a plurality of electrode units may be stacked on one or more of a plurality of arms 220 according to repetitive up-and-down movement of a stack table 100 to form an electrode assembly, and an alignment means 230 may be located on an arm on which a plurality of electrode units are stacked. As illustrated in FIG. 3, when an electrode assembly manufacturing apparatus 1000 comprises a first swing portion 200*a* and a second swing portion 200*b*, one or more alignment means 230 may be formed on any one arm 220 of the first swing portion 200*a* and any one arm 220 of the second swing portion 200*b*, and electrode assemblies may be stacked between these alignment means 230. Therefore, an alignment means 230 may be formed in a shape engaging with an end of an electrode unit. In FIG. 3, alignment means 230 are formed in an 'L' shape to engage with each corner of electrode units to be each located at a side end of an arm 220, but are not limited thereto, and aligning means 230 of various numbers and various shapes may be disposed at various positions to align electrode units during stacking.

Figure 4:
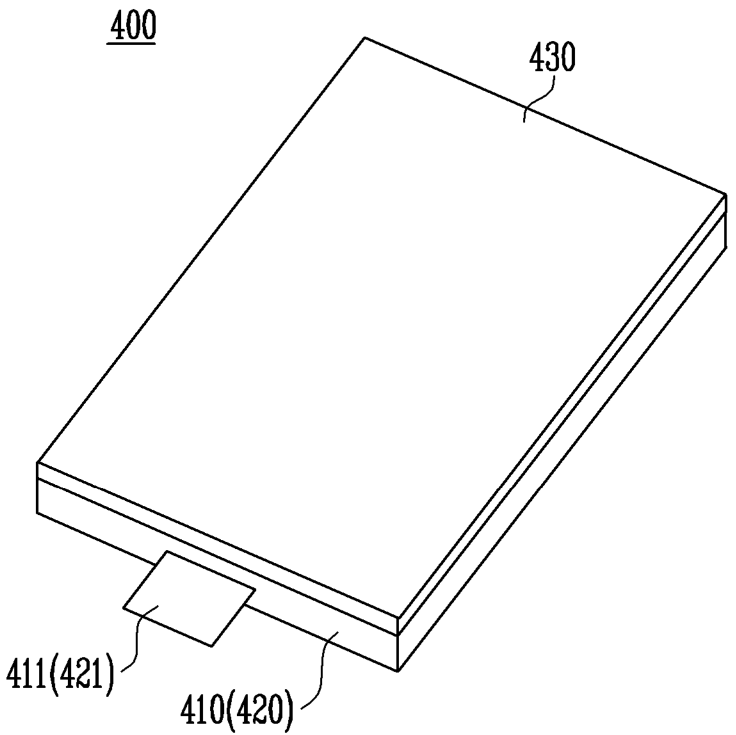
FIG. 4 is a diagram for explaining an electrode unit supplied to an electrode assembly manufacturing apparatus of FIG. 1.

FIG. 4 is a diagram for explaining an electrode unit supplied to an electrode assembly manufacturing apparatus of FIG. 1.

Referring to FIGS. 1 and 4, an electrode unit 400 may be a stack of a cathode 410 and a separator 430 or a stack of an anode 420 and a separator 430. In addition, a cathode tab 411 or an anode tab 421 may be formed at one end of a cathode 410 or an anode 420.

Accordingly, an electrode supply portion 300 may supply an electrode unit 400 in the form of a stack of a cathode 410 and a separator 430 or in the form of a stack of an anode 420 and a separator 430 to a stack table.

An electrode assembly may be formed as a plurality of electrode units 400 are stacked by a stack table 100 and a swing portion 200.

Figure 5:
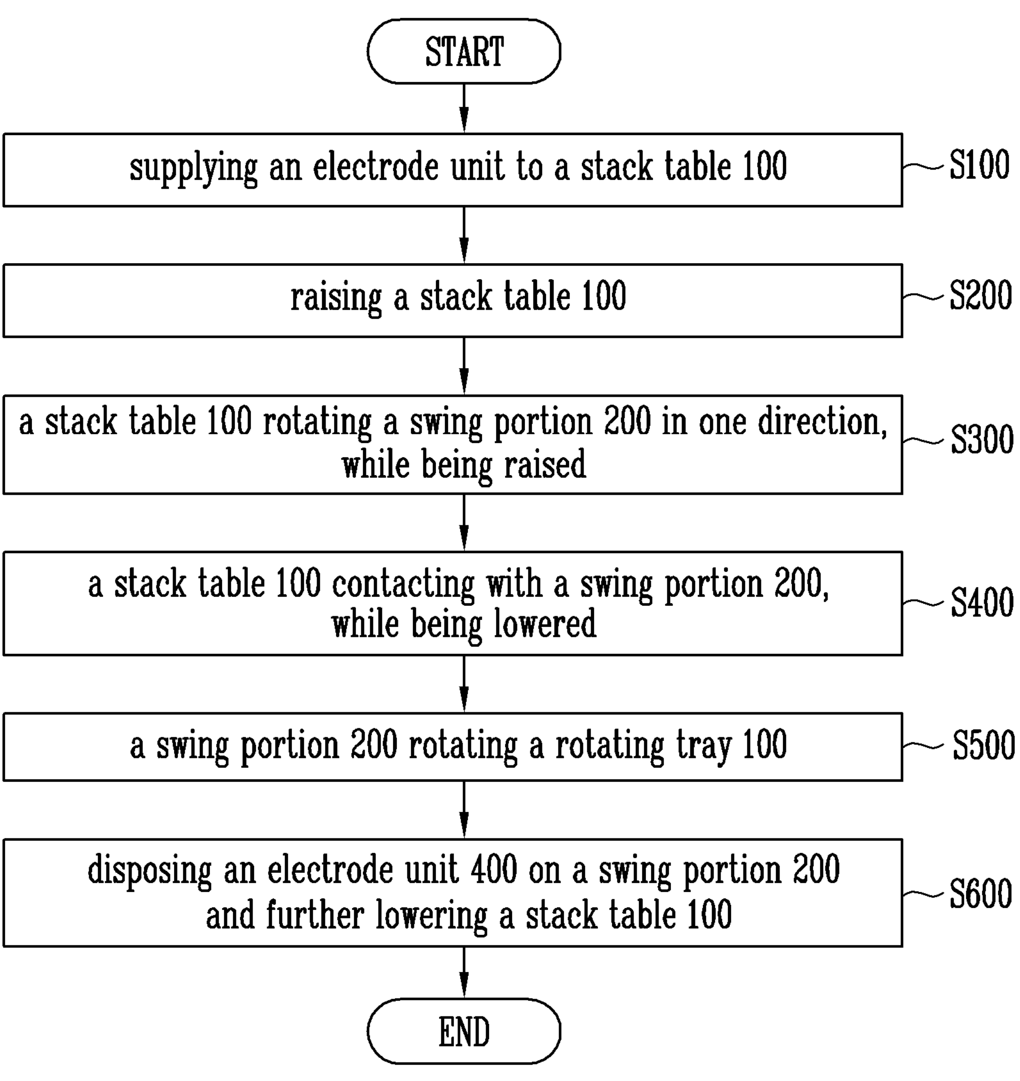
FIG. 5 is a flowchart for explaining an electrode assembly manufacturing method according to an Example of the present invention.

FIG. 5 is a flowchart for explaining an electrode assembly manufacturing method according to an Example of the present invention.

Referring to FIGS. 1 to 5, an electrode assembly manufacturing method according to an Example of the present invention may comprise supplying an electrode unit to a stack table 100 (S100). Here, an electrode unit 400 may comprise a cathode 410 or an anode 420, and more specifically, an electrode unit 400 may a stack of a cathode 410 and a separator 430 or a stack of an anode 420 and a separator 430. Therefore, an electrode assembly manufacturing method according to an Example of the present invention may further comprise, before S100, preparing an electrode unit 400 in the form of a stack of a cathode 410 or an anode 420 or in the form of a stack of an anode 420 and a separator 430. An electrode unit 400 may be disposed on a support 120 of a stack table 100. Supply of an electrode unit 400 may be performed through an electrode supply portion 300.

Next, an electrode assembly manufacturing method according to an Example of the present invention may comprise raising a stack table 100 (S200). At this time, an electrode unit 400 may have already been disposed the stack table 100.

Next, an electrode assembly manufacturing method according to an Example of the present invention may comprise a stack table 100 rotating a swing portion 200 in one direction, while being raised (S300). At this time, an upper part of the stack table 100 may contact with a lower part of one of a plurality of arms 220 included in a swing portion 200, and move one arm 220 in the upward direction, and accordingly, the swing portion 200 may rotate.

Next, an electrode assembly manufacturing method according to an Example of the present invention may comprise a stack table 100 contacting with a swing portion 200, while being lowered (S400). At this time, a lower part of a stack table 100 may contact with an upper part of another arm 220 among a plurality of arms 220 included in a swing portion 200 that is different from any one arm of step S300. In other words, arms contacted by a stack table 100 are different arms between S300 and S400.

Next, an electrode assembly manufacturing method according to an Example of the present invention may comprise a swing portion 200 rotating a rotating tray 100 (S500). A rotating tray 110 is coupled to a support 120, and a rotating tray 110 may rotate in the upward direction from a position parallel to a support 120 according to contact with a swing portion 200. At this time, the swing portion 200, more specifically, an arm 220 of the swing portion 200 ma rotates the rotating tray 110 in contact with the rotating tray 110, but may not contact with the support 120.

Next, an electrode assembly manufacturing method according to an Example of the present invention may comprise disposing an electrode unit 400 on a swing portion 200 and further lowering a stack table 100 (S600). As described above, in S500, when in contact with a stack table, an arm 220 of the swing portion 200 may contact with a rotating tray 100 to rotate the rotating tray 100 but may not contact with a support 120. Accordingly, while the stack table 100 passes through the arm 220 of the swing portion 200, the electrode unit 400 disposed on the support 120 can be caught by the arm 220 of the swing portion 200. Therefore, consequently, the electrode unit 400 may be disposed on the swing portion 200, and the stack table 100 may further be lowered.

After S600, a lowered stack table 100 may again be supplied with an electrode unit 400 from an electrode supply portion 300, and electrode units 400 may be stacked by repeating S100 to S600 described above to form an electrode assembly.

FIGS. 6A to 6G are perspective views for explaining an electrode assembly manufacturing process according to an Example of the present invention.

FIGS. 7A to 7L are front views for explaining an electrode assembly manufacturing process according to an Example of the present invention.

Figure 6A:
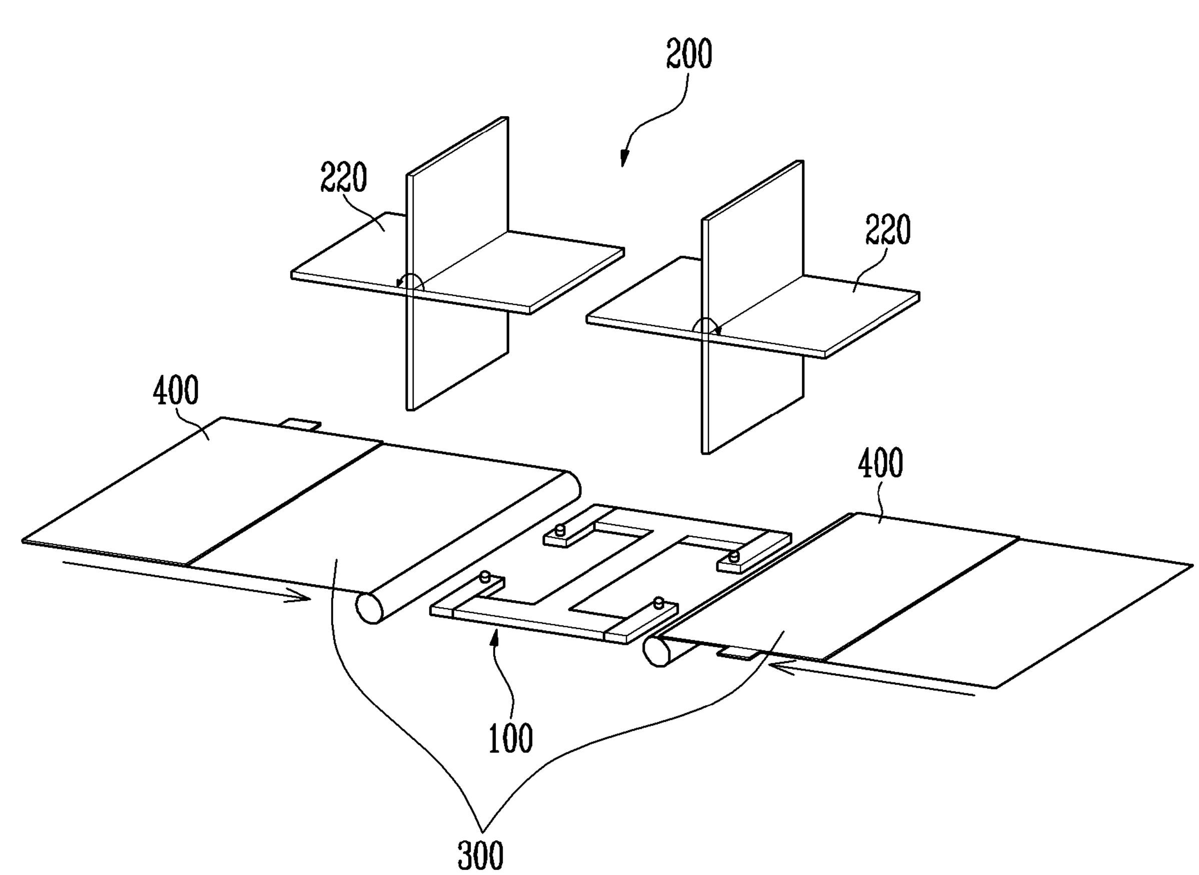
FIGS. 6A to 6G are perspective views for explaining an electrode assembly manufacturing process according to an Example of the present invention.
Figure 6B:
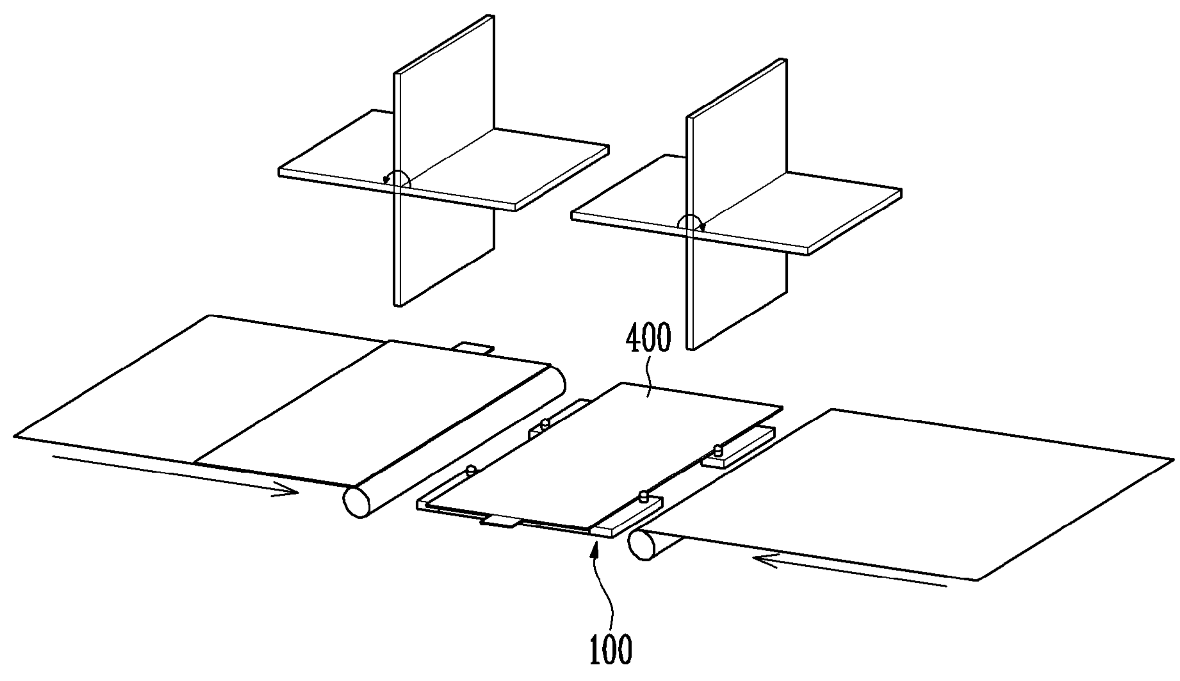

Referring to FIGS. 5, 6A to 6G, and 7A to 7L, an electrode supply portion 300 may supply an electrode unit 400 to a stack table 100 as in S100 of FIG. 5. An electrode unit 400 is moved toward a stack table 100 by an electrode supply portion 300 (FIGS. 6A and 7A), wherein an electrode unit comprising an anode and an electrode unit comprising a cathode may be moved to opposite direction from each other through different electrode supply portions 300. Accordingly, an electrode unit 400 may be disposed on a stack table 100 (FIGS. 6B and 7B).

Figure 6C:
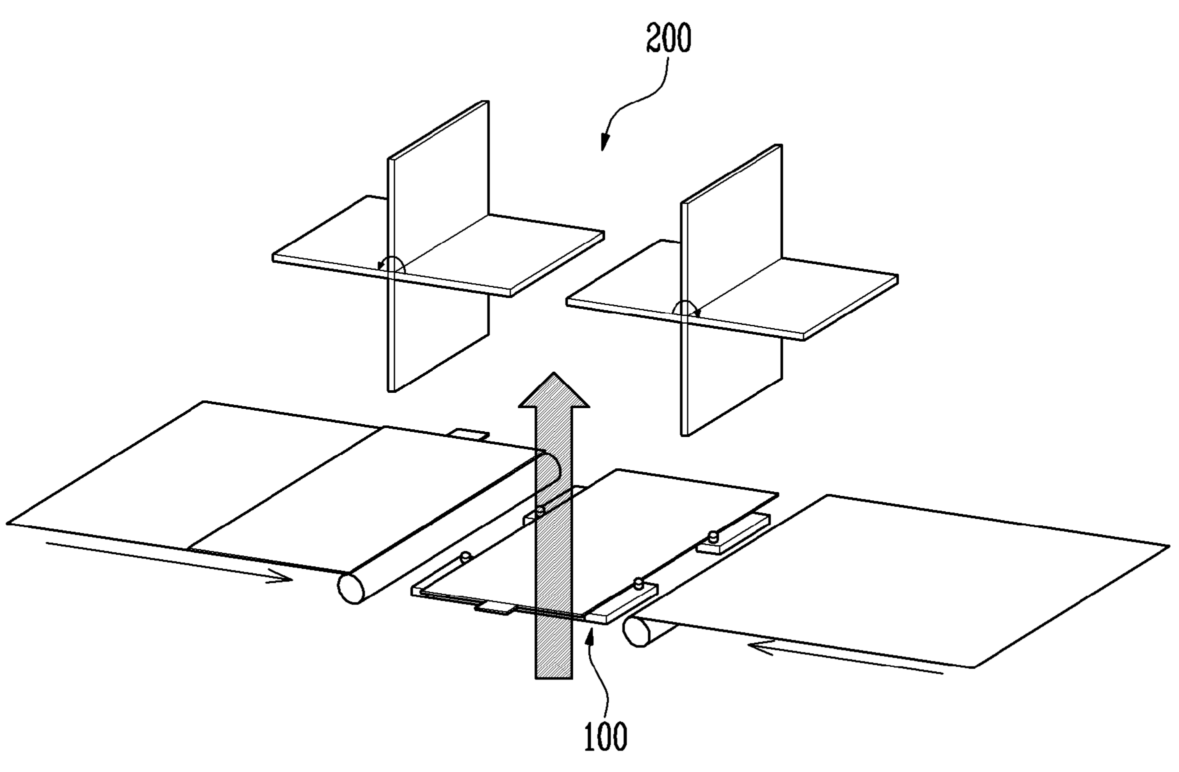
Figure 7A:
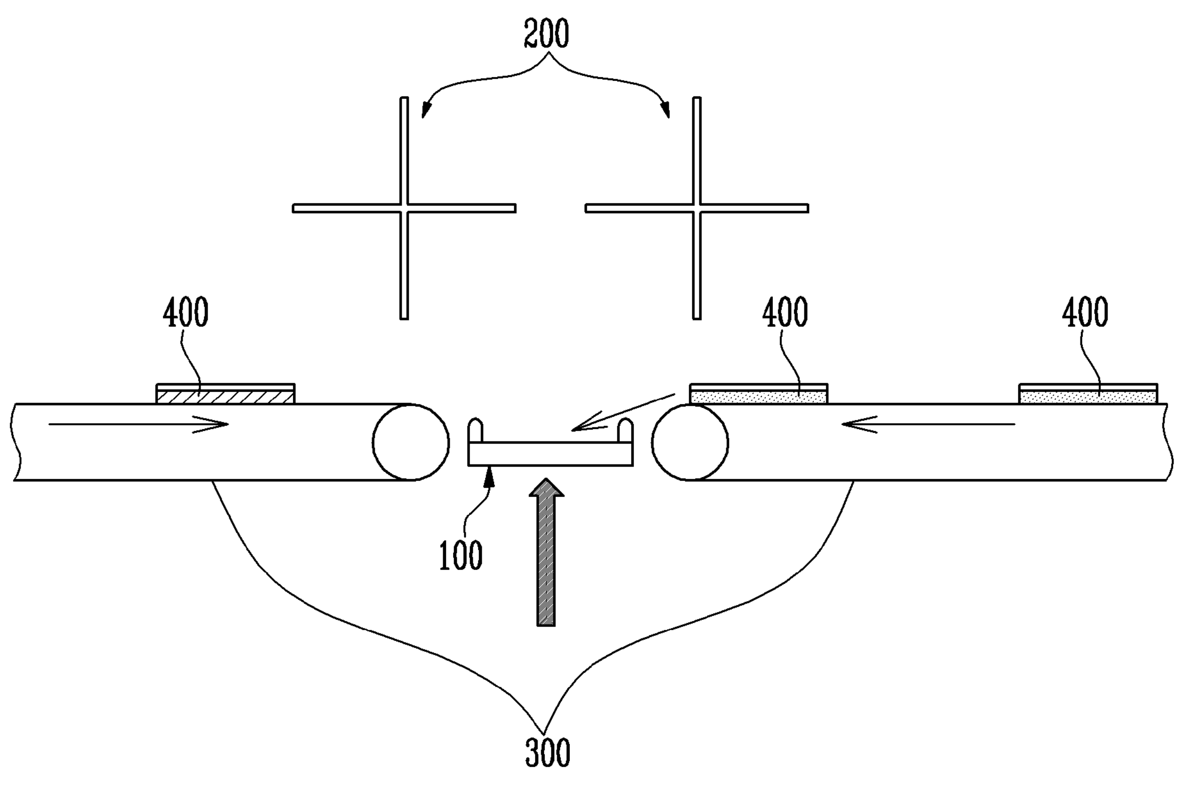
FIGS. 7A to 7L are front views for explaining an electrode assembly manufacturing process according to an Example of the present invention.
Figure 7B:
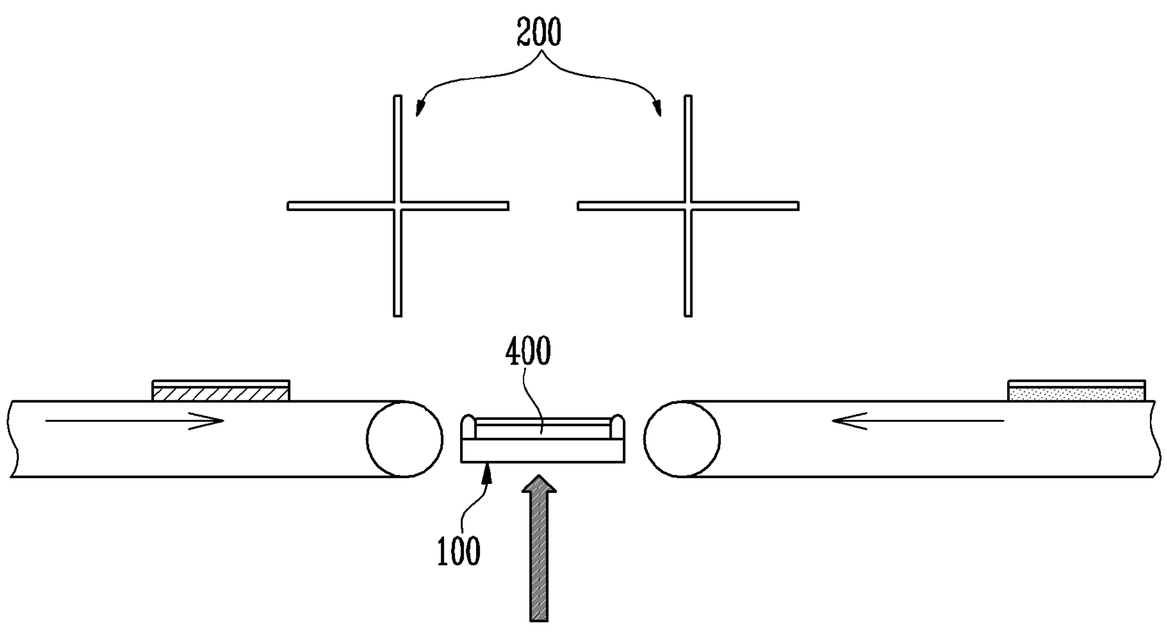
Figure 7C:
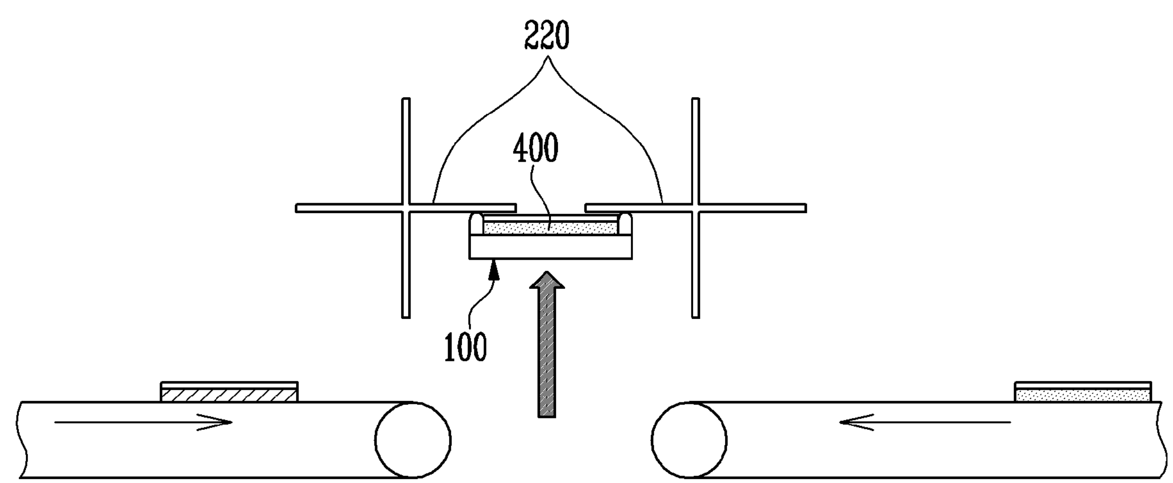

Next, as in S200 of FIG. 5, a stack table 100 on which an electrode unit 400 is disposed may be raised (FIGS. 6C and 7C).

Figure 6D:
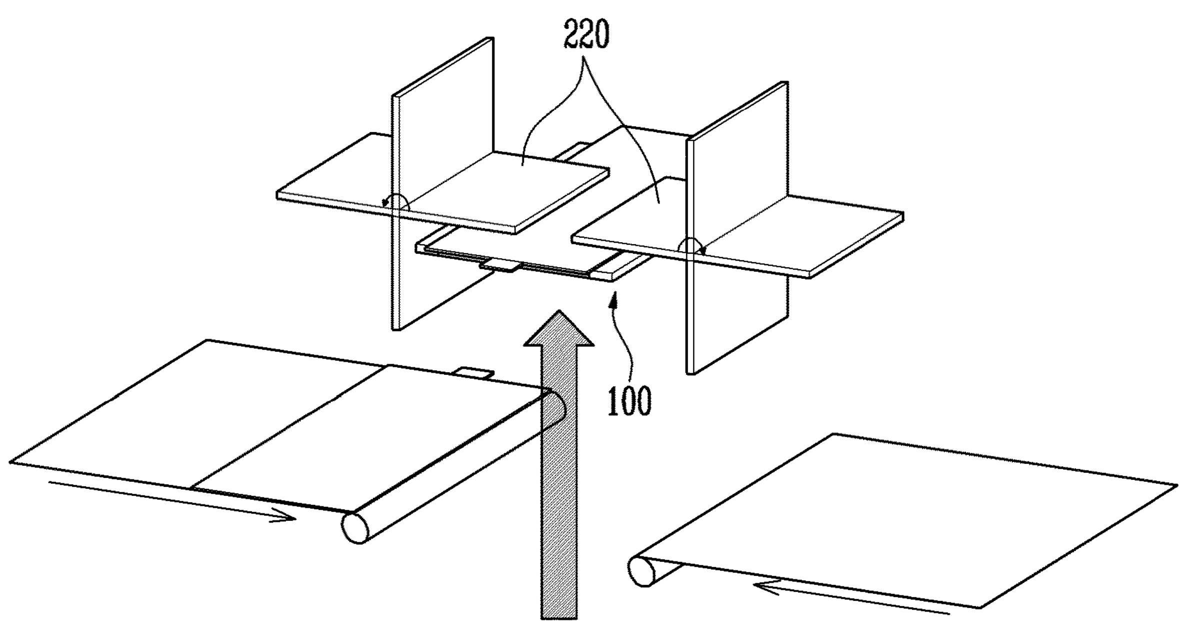
Figure 7D:
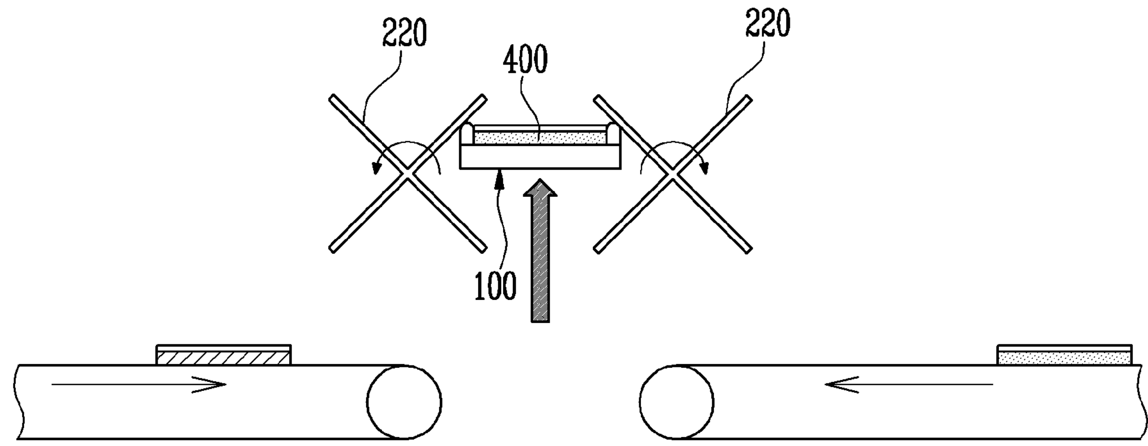

Next, as in S300 of FIG. 5, as a stack table 100 is raised, a swing portion 200 may be rotated in one direction (FIGS. 6D and 7D). An upper part of a stack table 100 may contact with a lower part of an arm 220 of a swing portion 200 and push the arm 220 in the upward direction so that one swing portion may rotate counterclockwise and the other swing portion may rotate clockwise.

Figure 6E:
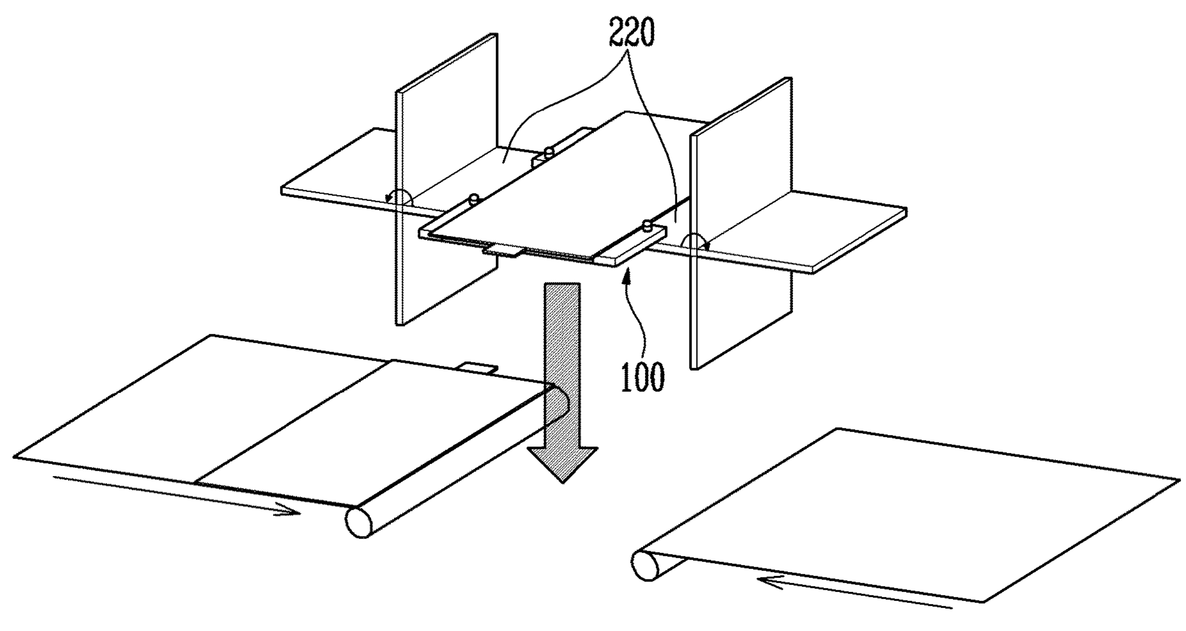
Figure 7E:
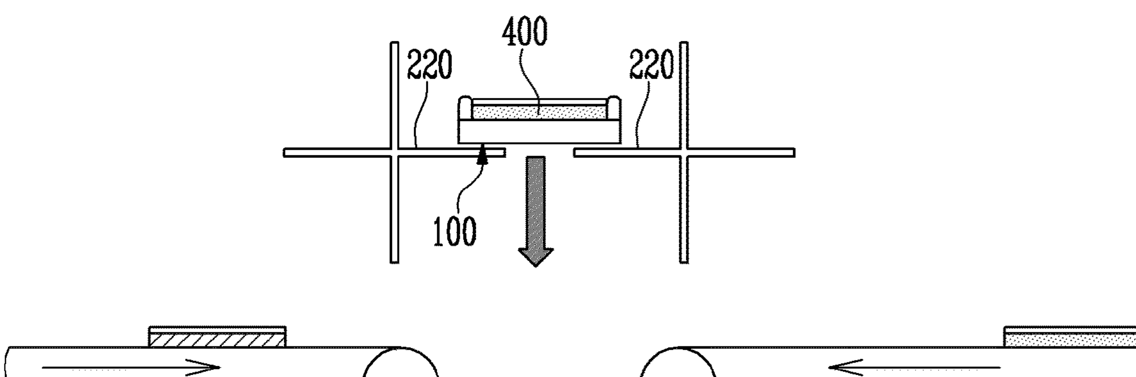

Next, as in S400 of FIG. 5, a stack table 100 may contact with a swing portion 200 while being lowered (FIGS. 6E and 7E). A lower part of a stack table 100 may contact with an upper part of another arm 220 that is different from the arm that the swing portion 200 contacts in S300. At this time, the swing portion 200 may rotate in the same rotating direction as in S300, or only the stack table 100 may be lowered while the swing portion 200 is in a fixed state without rotation so that the stack table may contact with the swing portion 200.

Figure 6F:
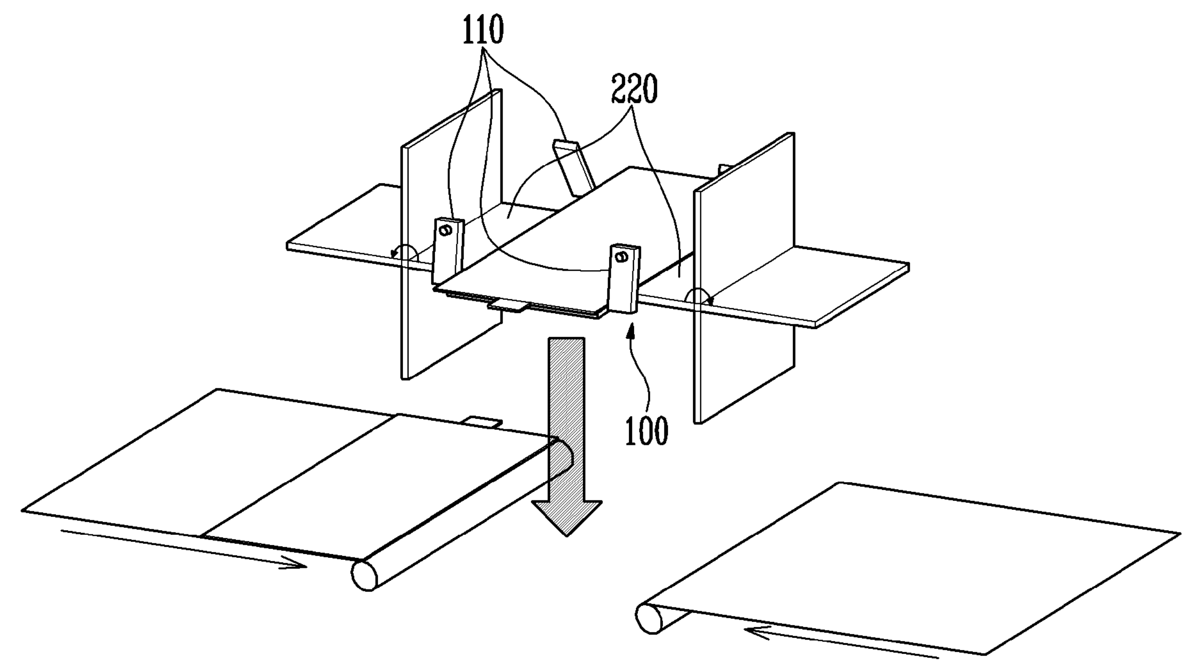
Figure 7F:
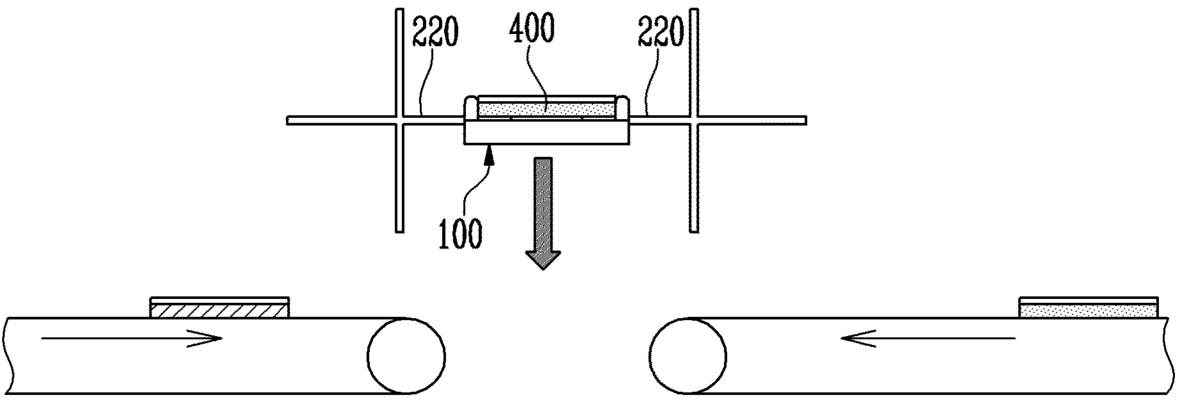

Next, as in S500 of FIG. 5, the swing portion 200 may rotate a rotating tray 110 (FIGS. 6F and 7F). A rotating tray 110 may rotate in the upward direction from a position parallel to a support 120. At this time, an arm 220 of the swing portion 200 may contact with only the rotating tray 110 and may not contact with the support 120. Accordingly, the arm 220 of the swing portion 200 may pass through a stack table 100 and contact with a lower part of an electrode unit 400 disposed on the stack table 100.

Figure 6G:
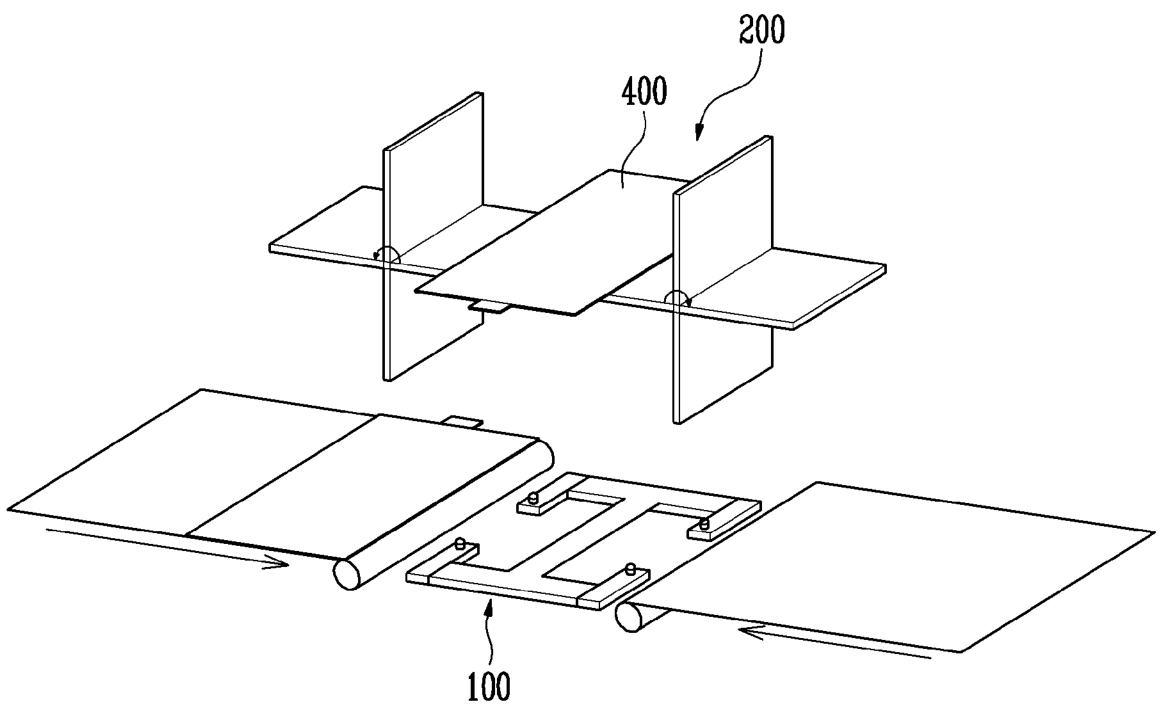
Figure 7G:
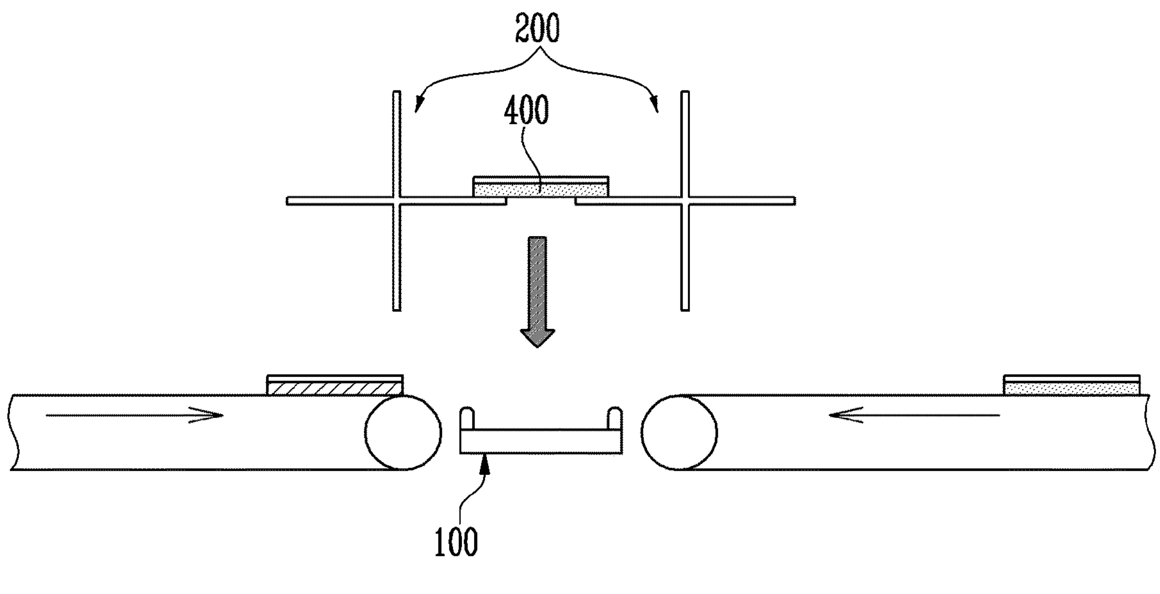
Figure 7H:
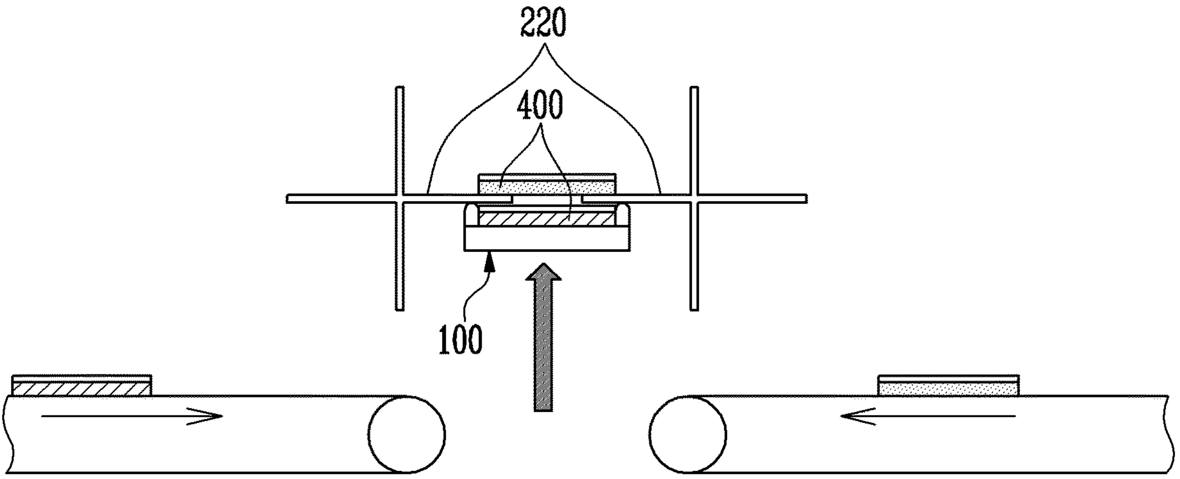

Next, as in S600 of FIG. 5, an electrode unit 400 is disposed on a swing portion 200, and a stack table 100 may further be lowered (FIGS. 6G and 7G). In other words, an arm 220 of the swing portion 200 only contacts with a rotating tray 110 and does not contact with a support 120, and as the rotating tray 110 rotates, the stack table 100 may pass through the swing portion 200 to be lowered in the downward direction. At this time, the stack table 100 may pass through the arm 220 of the swing portion 200, while the electrode unit 400 is caught on the arm 220 of the swing portion 200 so that the electrode unit 400 may be disposed on the arm 220 of the swing portion 200.

Figure 7I:
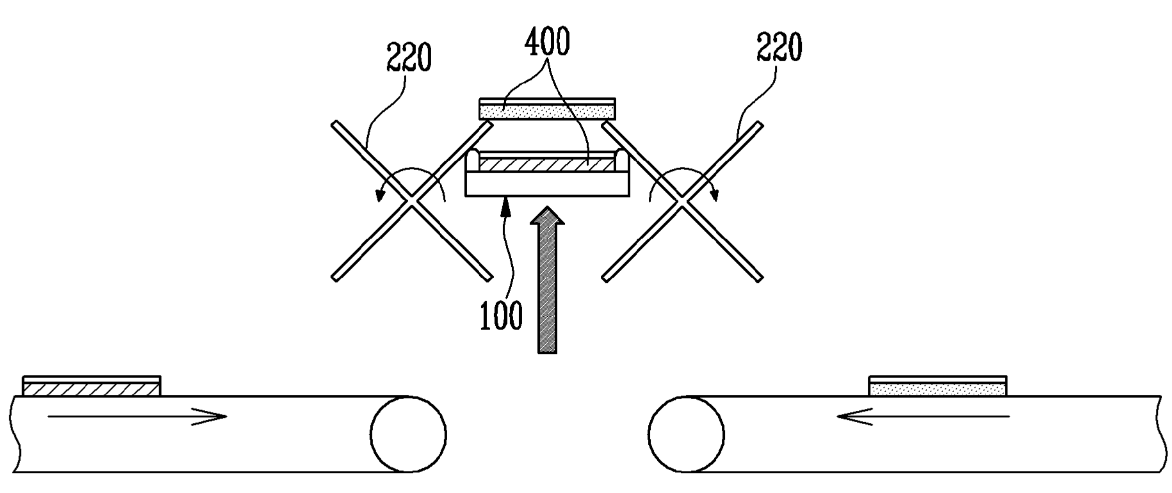
Figure 7J:
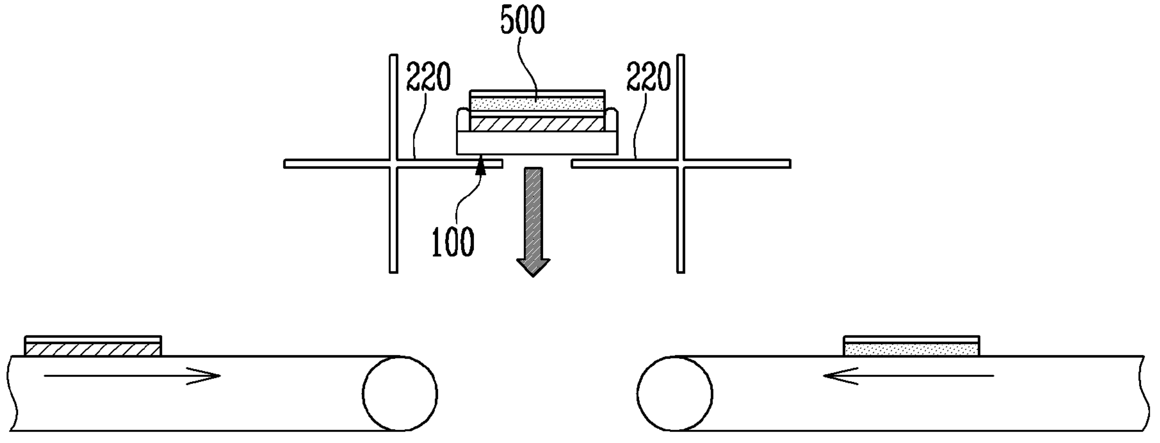
Figures 7K, 7L:
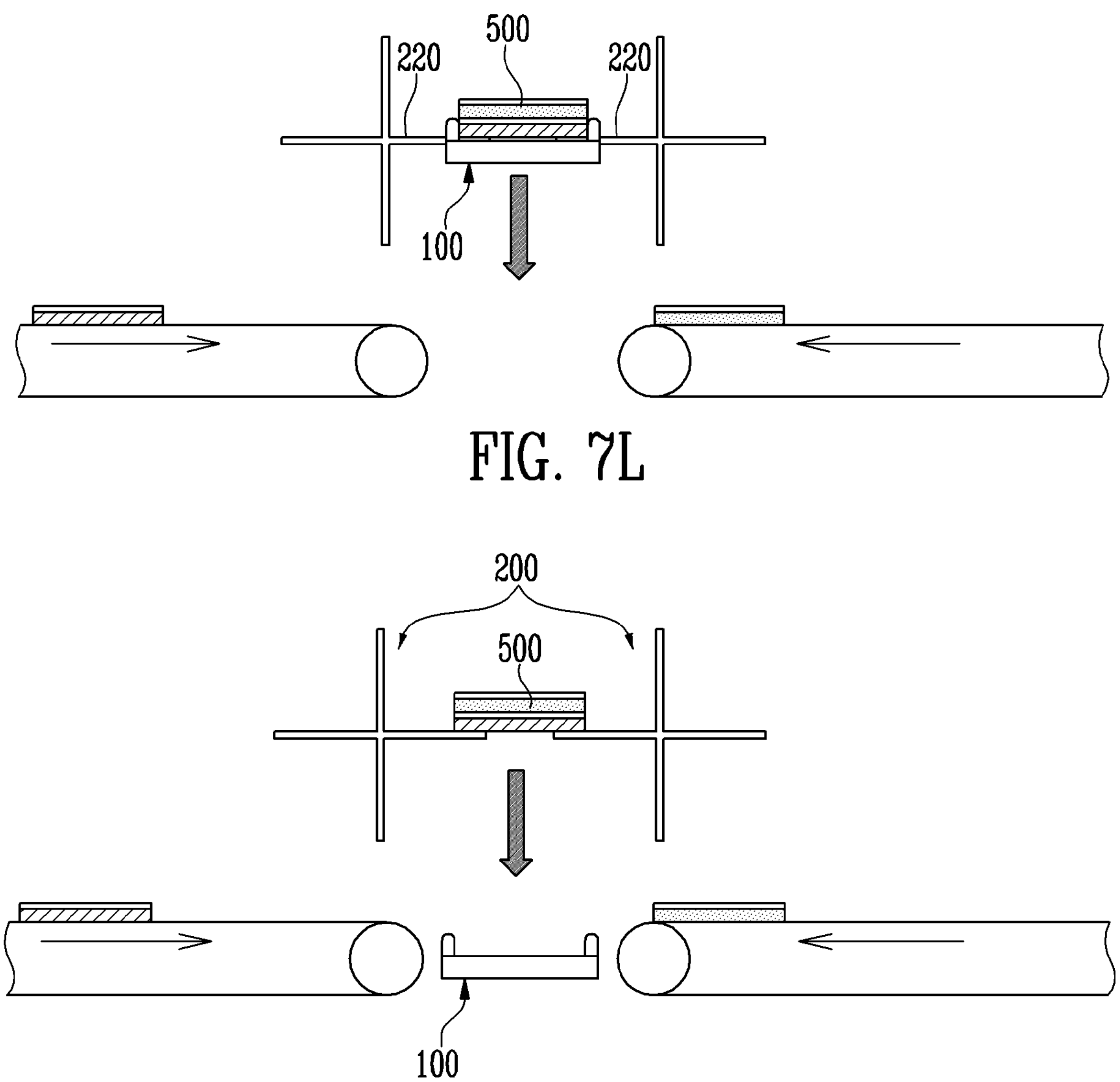

After that, the stack table 100 is again supplied with an electrode unit 400 from the electrode supply portion 300 and then is raised (FIG. 7H) to rotate again the swing portion 200 where the electrode unit 400 has been disposed (FIG. 7I). Thereafter, the stack table 100 is lowered in a state where an electrode assembly 500 in which two electrode units 400 are stacked is disposed on the stack table 100 (FIG. 7J), and accordingly, the rotating tray 110 rotates again (FIG. 7K), and the stack table 100 passes through the arm 220 of the swing portion 200 and is lowered downward, while the electrode assembly 500 is caught by the arm 220 of the swing portion 200 so that the electrode assembly 500 may be disposed on the arm 220 of the swing portion 200 (FIG. 7L).

By repeating this process, an electrode assembly in which a plurality of electrode units 400 are stacked may be manufactured.

An electrode assembly manufacturing apparatus and an electrode assembly manufacturing method according to an Example of the present invention use only up-and-down movement of a stack table during stacking, and a swing portion and a rotating tray may be driven only by the movement of a stack table without a separate power supply. Therefore, compared to the existing electrode assembly manufacturing method, there is an advantage in that the structure and process of the manufacturing apparatus can be simplified and power consumption can be reduced.

Figure 8:
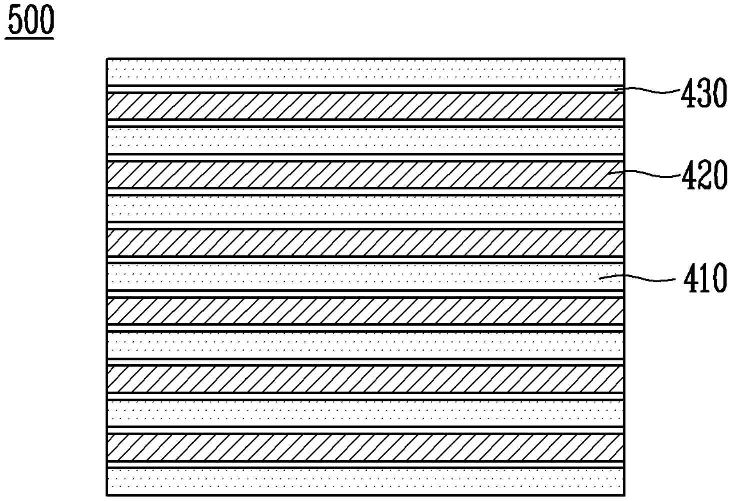
FIG. 8 is a diagram for explaining an electrode assembly manufactured by an electrode assembly manufacturing process according to an Example of the present invention.

FIG. 8 is a diagram for explaining an electrode assembly manufactured by an electrode assembly manufacturing process according to an Example of the present invention.

Referring to FIGS. 4 and 8, an electrode assembly 500 may be manufactured by repeatedly stacking an electrode unit 400 in the form of a cathode 410-separator 430 stack and an electrode unit 400 in the form of an anode 420-separator 430 stack. Accordingly, each component of an electrode assembly 500 may be stacked in the form of a cathode 410-separator 430-anode 420-separator 430-cathode 410 or the like.

A cathode and an anode may each comprise a current collector and an active material layer disposed on the current collector. For example, a cathode may comprise a cathode current collector and a cathode active material layer, and an anode may comprise an anode current collector and an anode active material layer.

A current collector may comprise a known conductive material within a range materials that do not cause a chemical reaction in lithium secondary batteries. For example, a current collector may comprise any one of stainless steel, nickel (Ni), aluminum (Al), titanium (Ti), copper (Cu), and alloys thereof, and may be provided in various forms such as film, sheet, and foil.

An active material layer may comprise an active material. For example, a cathode active material layer may comprise a cathode active material, and an anode active material layer may comprise an anode active material.

A cathode active material may be a material into which lithium (Li) ions may be intercalated and deintercalated. A cathode active material may be a lithium metal oxide. For example, a cathode active material may comprise a lithium manganese-based oxide, a lithium nickel-based oxide, a lithium cobalt-based oxide, a lithium nickel manganese-based oxide, a lithium nickel cobalt manganese-based oxide, a lithium nickel cobalt aluminum-based oxide, a lithium iron phosphate-based compound, a lithium manganese phosphate-based compound, a lithium cobalt phosphate-based compound, and a lithium vanadium phosphate-based compound, but is not necessarily limited to a specific example.

An anode active material may be a material into which lithium (Li) ions may be intercalated and deintercalated. For example, an anode active material may be any one of carbon-based materials such as crystalline carbon, amorphous carbon, carbon composite, and carbon fiber, a lithium alloy, silicon (Si), and tin (Sn). According to an Example, an anode active material may be natural graphite or artificial graphite, but is not limited to a specific example.

A cathode and an anode may each further comprise a binder and a conductive material.

The binder may improve mechanical stability by mediating a bond between a current collector and an active material layer. According to an Example, a binder may be an organic binder or an aqueous binder, and may be used together with a thickener such as carboxymethyl cellulose (CMC). According to an Example, an organic binder may be one of vinylidene fluoride-hexafluoropropylene copolymer (PVDF-co-HFP), polyvinylidene fluoride (PVDF), polyacrylonitrile, and polymethylmethacrylate, and an aqueous binder may be styrene-butadiene rubber (SBR), but is not necessarily limited thereto.

A conductive material may improve electrical conductivity of lithium secondary batteries. A conductive material may comprise a metal-based material. According to an Example, a conductive material may comprise a common carbon-based conductive material. For example, a conductive material may comprise any one of graphite, carbon black, graphene, and carbon nanotube. Preferably, a conductive material may comprise carbon nanotube.

In addition, an electrode assembly may further comprise a cathode tab 411 extending from a cathode and an anode tab 421 extending from an anode. In one Example, a cathode tab and an anode tab may protrude in the same direction or in opposite directions.

A separator may be configured to prevent an electrical short circuit between a cathode plate and an anode plate and to generate a flow of ions.

According to an Example, a separator may comprise a porous polymer film or a porous non-woven fabric. Here, the porous polymer film may be configured as a single layer or a multilayer comprising a polyolefin polymer such as an ethylene polymer, a propylene polymer, an ethylene/butene copolymer, an ethylene/hexene copolymer, and an ethylene/methacrylate. A porous nonwoven fabric may comprise glass fibers and polyethylene terephthalate fibers with a high melting point, but it is not limited thereto, and according to an Example, a separator may be a ceramic coated separator (CCS) comprising ceramic.

What is claimed is:

1. An electrode assembly manufacturing apparatus comprising:

a stack table performing repetitive up-and-down movement;

an electrode supply portion supplying an electrode unit comprising a cathode or an anode to the stack table; and a swing portion rotating according to contact with the stack table, wherein the stack table comprises: a support that supports the electrode unit and that does not contact with the swing portion while the stack table is raised or lowered; and a rotating tray coupled to the support and rotating by contacting with the swing portion while the stack table is lowered.

2. The electrode assembly manufacturing apparatus according to claim 1, wherein the swing portion is located above the electrode supplier, and the stack table perform repetitive up-and-down movement to pass the height between the swing portion and the electrode supplier.

3. The electrode assembly manufacturing apparatus according to claim 2, wherein the electrode supply portion supplies the electrode unit when the stack table is located at the same height as the electrode supply portion or at a position lower than the electrode supply portion.

4. The electrode assembly manufacturing apparatus according to claim 1, wherein the electrode unit electrode is a cathode-separator stack or an anode-separator stack.

5. The electrode assembly manufacturing apparatus according to claim 4, wherein the electrode supply portion comprises a cathode supply portion supplying the cathode-separator stack; and an anode supply portion supplying the anode-separator stack.

6. The electrode assembly manufacturing apparatus according to claim 5, wherein the cathode supply portion and the anode supply portion supply the cathode-separator stack and the anode-separator stack in different direction from each other.

7. The electrode assembly manufacturing apparatus according to claim 1, wherein the swing portion comprises a rotation shaft and a plurality of arms extending from the rotation shaft and rotating around the rotation shaft by contacting with the stack table.

8. The electrode assembly manufacturing apparatus according to claim 7, wherein during one cycle of up-and-down movement, the stack table contact with at least two arms.

9. The electrode assembly manufacturing apparatus according to claim 7, wherein one or more of the plurality of arms comprises an alignment means extending in a direction perpendicular to the direction in which the arms extend from the rotation shaft.

10. The electrode assembly manufacturing apparatus according to claim 1, wherein the swing portion comprises a first swing portion and a second swing portion rotating in opposite directions from each other.

11. The electrode assembly manufacturing apparatus according to claim 1, wherein the rotating tray does not rotate while the stack table is lowered.

12. The electrode assembly manufacturing apparatus according to claim 11, wherein the rotating tray rotates in the upward direction from a position parallel to the support.

13. The electrode assembly manufacturing apparatus according to claim 10, wherein the rotating tray comprises a first rotating tray contacting with the first swing portion and a second rotating tray contacting with the second swing portion.

14. The electrode assembly manufacturing apparatus according to claim 13, wherein the distance between the first rotating tray and the second rotating tray is greater than or equal to the width of the electrode unit.

15. An electrode assembly manufacturing method comprising:

an electrode supply portion providing an electrode unit comprising a cathode or an anode on a support of a stack table;

a stack table on which an electrode unit is disposed being raised;

the stack table rotating a swing portion in one direction while being raised;

the stack table contacting with the swing portion, while being lowered;

the swing portion rotating a rotating tray of the stack table coupled to the support; and disposing the electrode unit on the swing portion and further lowering the stack table.

16. The electrode assembly manufacturing method according to claim 15, wherein in the swing portion rotating the rotating tray, the swing portion does not contact with the support.

17. The electrode assembly manufacturing method according to claim 15, further comprising: preparing an electrode unit which is a cathode-separator stack or an anode-separator stack.

* * * * *